US005697521A

United States Patent [19]

Dixon

[11] Patent Number: 5,697,521
[45] Date of Patent: Dec. 16, 1997

[54] HAND-HELD COLLAR DISPENSER

[75] Inventor: Richard D. Dixon, Woodstock, N.Y.

[73] Assignee: Huck International, Kingston, N.Y.

[21] Appl. No.: 457,359

[22] Filed: Jun. 1, 1995

[51] Int. Cl.⁶ .................................................. B65D 83/04
[52] U.S. Cl. .............................................. 221/297; 221/310
[58] Field of Search ............................... 221/240, 267, 221/297, 301, 310, 312 A; 29/809

[56] References Cited

U.S. PATENT DOCUMENTS

| | | | |
|---|---|---|---|
| 2,611,289 | 9/1952 | Frank | 221/310 X |
| 2,754,703 | 7/1956 | Huck | 78/46 |
| 3,215,024 | 11/1965 | Brilmyer et al. | 85/7 |
| 4,071,948 | 2/1978 | Deutzmann | 221/310 X |
| 4,170,820 | 10/1979 | Klose | 29/809 X |
| 5,016,346 | 5/1991 | Gerst et al. | 29/809 X |
| 5,142,774 | 9/1992 | Jeffery | 29/810 |

Primary Examiner—F. J. Bartuska
Attorney, Agent, or Firm—Cushman Darby & Cushman IP Group of Pillsbury Madison & Sutro, LLP; Ronald L. Lyons, Esq.

[57] ABSTRACT

An improved hand-held collar dispenser for securing collars to a lockbolt or other fastening piece is disclosed. The dispenser has a feeding end and a dispensing end connected by a channel. A pair of retention clips selectively retains the collars within the body until the user chooses to dispense a collar. The retention clips are pivotally mounted to a guide block which moves between an extended position and a retracted position. When the guide block is in the retracted position, the tail of each retention clip abuts a respective angled surface preventing the retention clips from rotating. As the guide block moves between the retracted and extended positions, each retention clip slides along its corresponding angled surface permitting the retention clips to rotate to an open position in which a collar is permitted to pass between the claw ends of the retention clips and exit the dispenser.

22 Claims, 7 Drawing Sheets

HAND-HELD COLLAR DISPENSER

BACKGROUND

1. The Field of the Invention

The present invention relates generally to installation apparatus for two-piece fasteners such as lockbolts which include a pin with a collar adapted to be swaged thereon, and more particularly to an improved hand-held collar dispenser for use in providing a supply of collars and aiding in the placement of a collar over the pintail of the fastener.

2. Technical Background

In fastening workpieces together with two-piece fasteners such as lockbolts or nut-and-bolt combinations, there are numerous applications which are not susceptible to automatic fastening systems. In these situations, the fastener portion must be secured to the mount by hand operation. This is true for swage-type fasteners, or lockbolts, which comprise a pin and a collar, and threaded fasteners, which comprise a nut and a bolt. A lockbolt generally comprises a pin and a tubular collar adapted to be swaged into locking grooves in the pin. The installation procedure for manual installation of such a fastener requires the pin to be inserted through aligned openings and the collar to be placed upon the pin. An installation tool is then utilized to grip the pin and swage the collar onto the pin.

In the past, hand-held collar dispensers have been utilized to expedite the placement of the collar onto the pin. Such hand-held devices generally use a conventional air supply and a pre-filled magazine assembly to feed collars to a collar retention mechanism. The collars can then be dispensed from the device one at a time.

The purpose of such a collar dispenser is to aid the user in the repetitive job of orienting and manipulating the collar by simplifying the placement of the collar onto its mating lockbolt pin. The collar dispenser can be used to maintain the collar in position while the user positions the installation tool to swage the collar onto the pin. Such collar dispensing devices are particularly suited for overhead installations and installation of very small collars in limited access areas.

At least one previous design of a hand-held collar dispensing device utilizes a collar retention mechanism which employs plastic retention clips that rely upon the resilience of the plastic to create an opened clip position, thereby permitting collar removal from the device and onto the mating lockbolt pin. With repeated usage, however, these plastic collar clips lose their elasticity, taking an ever-widening permanent set. This significantly reduces the clips ability to uniformly retain the collars within the dispenser. Hand-held collar dispensers utilizing other types of flexible materials for retention clips experience the same problems.

Another drawback to the use of the plastic collar clips is that only light-weight collars can generally be used. If heavier collars are used, increased air pressures would be required to move the collars through the assembly. The same would be true if larger sized collars were used. Once the collar supply depletes to a certain level, the increased air pressure being utilized may overcome the limited resistance to bending of the plastic collar clips and cause premature ejection of some or all of the remaining collars from the device.

Yet other dispensing devices utilize a collar retention mechanism incorporating an unsupported cantilever design. These devices require carefully regulated air pressure to move the queue of collars from the tube magazine, through the device, and into engagement with the retention clips. Careful regulation of the air pressure is required to avoid incidents of high pressure which could cause the clips to be forced open unexpectedly, ejecting the entire or remaining load of collars out of the device. The force provided by the air supply, even though regulated, has to be sufficient to move the collars into the device from a fully loaded tube magazine. As the collar supply is depleted, the force needed to move the collars up to the clips is reduced. If the air pressure is held constant, creating a greater than necessary force on the remaining collars, premature ejection from the device could result.

If these cantilevered retention clips are constructed to have stiffer cross-sections it is believed that the removal force required to open clips in a cantilever design would increase to an undesirable level. In either event the device could be considered either unreliable if subject to premature collar ejection or less than desirable because of the requirement of high removal forces.

From the foregoing, it will be appreciated that it would be an advancement in the art to provide a hand-held collar dispenser utilizing sufficiently rigid collar retention clips.

It would be a further advancement in the art to provide a hand-held collar dispenser utilizing a unique opening action for the retention clips which permits the placement and release of a collar with relative ease regardless of the stiffness of the retention clips.

Such an improved hand-held collar dispenser is disclosed and claimed herein.

BRIEF SUMMARY AND OBJECTS OF THE INVENTION

The present invention is directed to an improved hand-held device for dispensing collars to be secured to a lockbolt or other fastening piece.

In one embodiment, the collar dispenser has a body with a feeding end and a dispensing end. Each end is connected by a channel which is preferably configured to maintain several collars in substantially end-to-end alignment as the collars pass through the channel. The collars are urged through the interior channel towards the dispensing end by directing a supply of air into the feeding end of the body. In the presently preferred embodiment of the invention, air pressure applied will generally be between 20 pounds per square inch and 60 pounds per square inch. A pair of retention clips, having a claw end that conforms to the outer diameter of each collar, and a tail end, is provided to selectively retain the collars within the body at the dispensing end.

In contrast to the cantilever mount utilized in many prior art designs, the retention clips of the present invention are pivotally mounted to a guide block within the dispensing end of the body. The guide block, and consequently the retention clips, are positioned within the dispensing end of the device for movement between an extended position and a retracted position. When the guide block is in the retracted position, the tail end of each retention clip abuts a respective angled surface within the dispensing end and prevents the retention clips from rotating to an open position. Thus, the collars are prevented from passing between the claw ends of the retention clips until dispensing is desired. In this position, the device may be used to place a collar over the lockbolt of a fastener.

As the user pulls the dispenser away from the lockbolt, the guide block moves between the retracted and extended positions and each retention clip slides along its corresponding angled surface. The sliding of the tail ends of the retention clips toward each other along the angled surfaces permits the retention clips to rotate to an open position in which a collar is permitted to pass between the claw ends of the retention clips and exit the dispenser.

The retention clips are attached to the guide block by means of a pivot pin. Each pivot pin extends through its respective retention clip and into the guide block providing the axis of rotation for its respective retention clip. The dispensing end of the collar dispenser includes a body which is configured with an internal slot corresponding to each pivot pin. The pivot pins are positioned within the internal slots so that each pivot pin abuts the first end of its respective internal slot when the guide block is in the retracted position and the second end of its respective internal slot when the guide block is in the extended position. This configuration limits the travel of the pivot pins, and thus, the travel of the retention clips and guide block.

The guide block rests in a longitudinal slot within the body which is configured to correspond to the exterior configuration of the guide block. The guide block is biased towards the retracted position by a pair of springs. The springs have one end attached to the guide block and a second end attached to the body. In a preferred embodiment, the springs are attached to the guide block by attaching them to the pivot pin. Biasing the guide block in the retracted position serves to bias the retention clips in the closed position because the angled surfaces prevent the rotation of the clip when the guide block is in the retracted position.

The guide block and the dispensing end of the body have a leading edge configured with a generally U-shaped notch. The notch allows the dispenser to be positioned over a lockbolt while the collar is still within the dispenser. The notch is beveled to facilitate guidance of each lockbolt into the collar bore.

Thus, it is an object of the present invention to provide a unique construction for a manually-actuated collar dispenser for use with lockbolts which permits the tubular collar member to be placed upon the lockbolt of the fastener.

These and other objects and advantages of the present invention will become more fully apparent by examination of the following description of the preferred embodiments and the accompanying drawings.

BRIEF DESCRIPTION OF THE DRAWINGS

A more particular description of the invention briefly described above will be rendered by reference to the appended drawings. Understanding that these drawings only provide information concerning typical embodiments of the invention and are not therefore to be considered limiting of its scope, the invention will be described and explained with additional specificity and detail through the use of the accompanying drawings, in which.

DETAILED DESCRIPTION OF THE PREFERRED EMBODIMENTS

Figure 1:
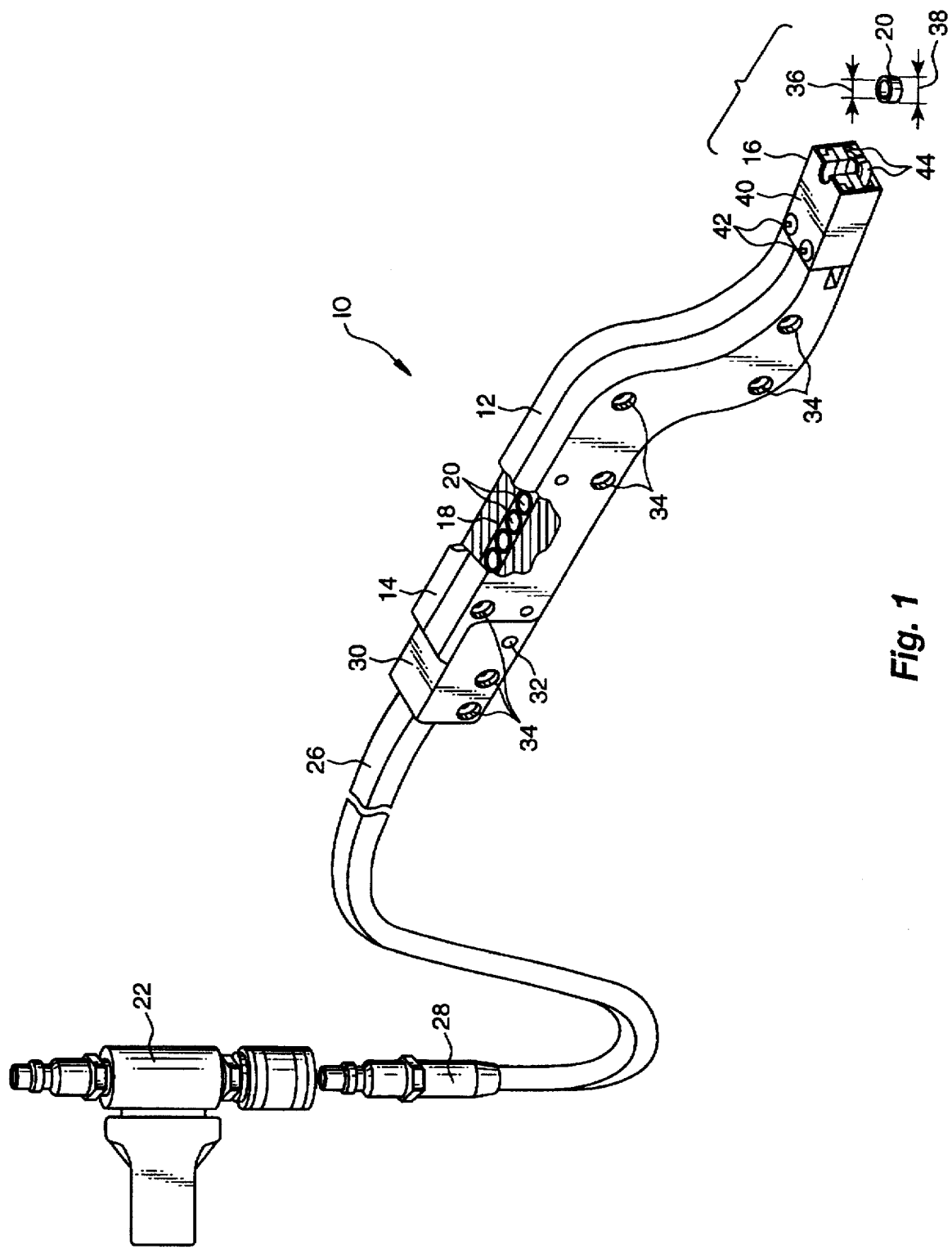
FIG. 1 is a perspective view of the improved hand-held collar dispenser with a partial cutaway showing a number of collars and a perspective view of a single collar.

Reference is now made to the figures wherein like parts are referred to by like numerals throughout. With particular reference to FIG. 1, an improved hand-held collar dispenser according to the present invention is generally designated at 10.

The dispenser 10 includes a body 12 having a feeding end 14 and a dispensing end 16. A channel 18 is disposed between the feeding end 14 and the dispensing end 16. The channel 18 is configured such that a collar 20 fed into the feeding end 14 may pass through the channel 18 to the dispensing end 16. The channel 18 maintains a plurality of collars 20 in substantially end-to-end alignment as the collars 20 pass through the channel 18. The channel 18 also maintains the orientation of the collars 20 as they pass through the channel 18. This is useful for workers applying beveled, flanged, or other asymmetrical collars to lock-bolts. For example, flanged or bevelled collars may have to be applied to the lockbolt with the flange or bevel oriented up or down. The hand-held collar dispenser of the present invention obviates the need for the worker to continually check the orientation of each collar before applying it to a lockbolt.

Figure 10:
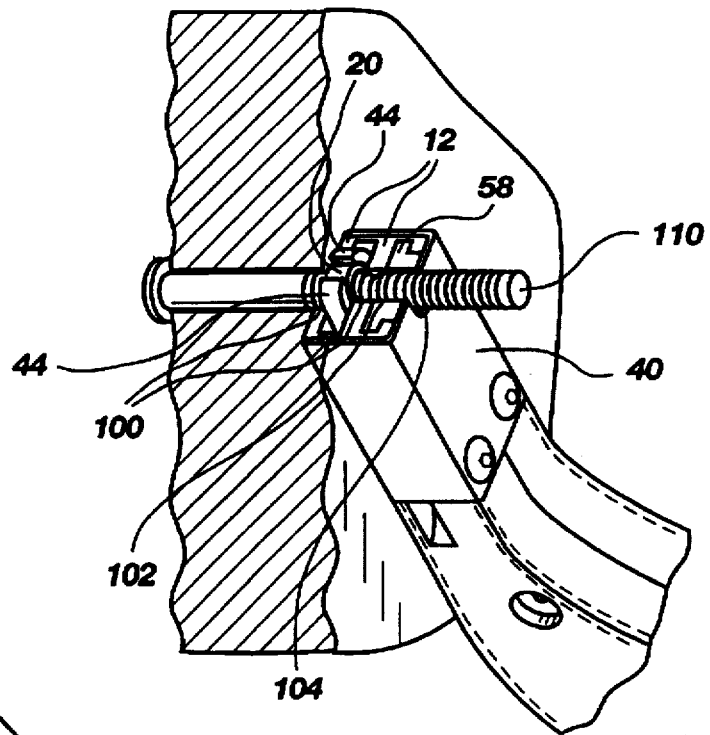
FIG. 10 is front perspective view of the hand-held collar dispenser of FIG. 1 showing a collar within the dispenser positioned over a lockbolt of a fastener.
Figure 11:
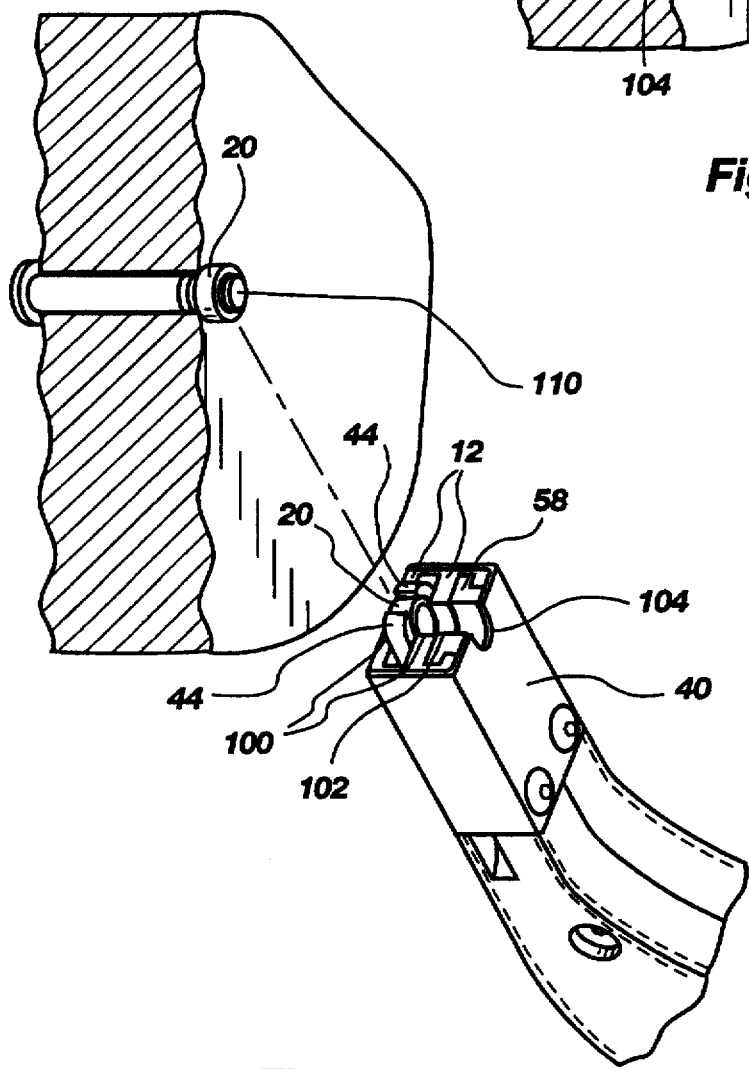
FIG. 11 is front perspective view of the hand-held collar dispenser of FIG. 1 showing the dispenser immediately after having deposited a collar over a lockbolt.

Each collar 20 is generally tube-shaped with a substantially circular perimeter, having an inner diameter 36 and an outer diameter 38. As illustrated in FIGS. 10 and 11, the inner diameter 36 substantially conforms to the outer diameter of a lock-bolt or other fastening device to which the collar 20 is to be attached. Referring back to FIG. 1, the outer diameter 38 is slightly smaller than the width of the channel 18, thereby permitting the collars 20 to easily travel through the channel 18.

The body 12 of the collar dispenser 10 is preferably manufactured in two longitudinal, mirror-image pieces. Grooves formed in each piece become the necessary channels, chambers, and slots when the pieces are connected. In this preferred embodiment, the two pieces are fastened together with a number of screws 34, although one of skill in the art will readily appreciated that the pieces can be fastened together using a variety of conventional means, including rivets, welds, or glue.

With continued reference to FIG. 1, a collar magazine 26 is attached to the receiving end 14 of the body 12. The magazine is configured to slidably maintain a supply of collars 20 in end-to-end alignment. One end of the magazine 26 is fitted with a conventional coupling 28 for connection to a fixed air regulator. The other end of the magazine 26 is fitted with an attachment clasp 30. The clasp 30 attaches to the dispenser and aligns the end of the magazine 26 with an opening (not shown) in the feeding end 14 of the body 12 allowing the supply of collars 20 to move easily from the magazine 26 into the channel 18 while maintaining end-to-end alignment.

The connections of the magazine 26 to the fixed air regulator and body 12 of the collar dispenser 10 are not essential to the practice of this invention and are capable of a variety of embodiments known to one of skill in the art. The clasp 30 of this preferred embodiment is configured for mating engagement with the feeding end 14 of the collar dispenser 10. The clasp 30 is held in place by a push pin mechanism. A hole 32 is disposed within the clasp 30 for receiving a push pin (not shown) biased outwardly from the feeding end and extending through the hole 32 in the clasp 30 when the clasp 30 is positioned for mating engagement.

A metal casing 40 is secured about the dispensing end 16 with casing screws 42 to prevent dirt or other particles from inhibiting the workings of the collar dispenser 10. It will be appreciated that the casing 40 could be made of a variety of materials and in a variety of configurations, including a hard plastic sheath that slides over the dispensing end 16 of the body 12.

Figure 2:
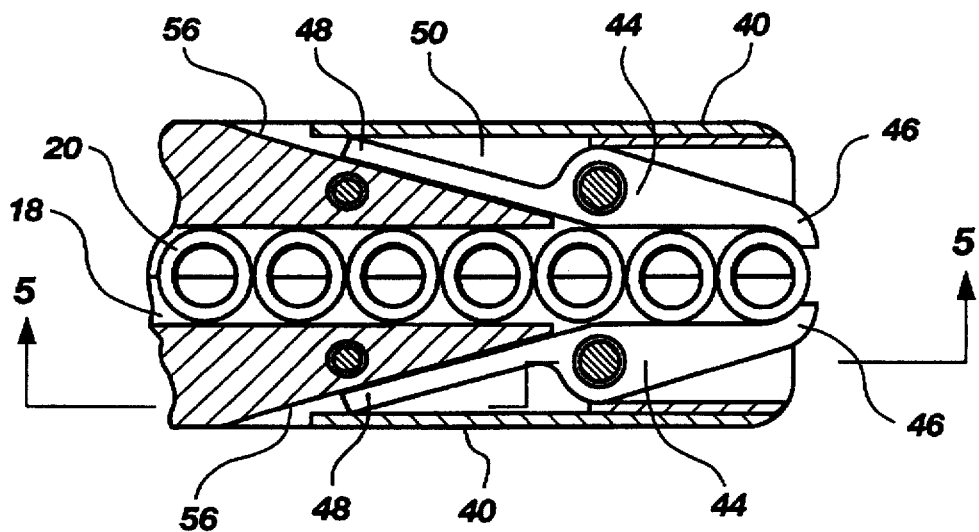
FIG. 2 is a top cross-sectional view of the dispensing end of the hand-held collar dispenser of FIG. 1 showing a pair of retention clips in a retracted position.
Figure 3:
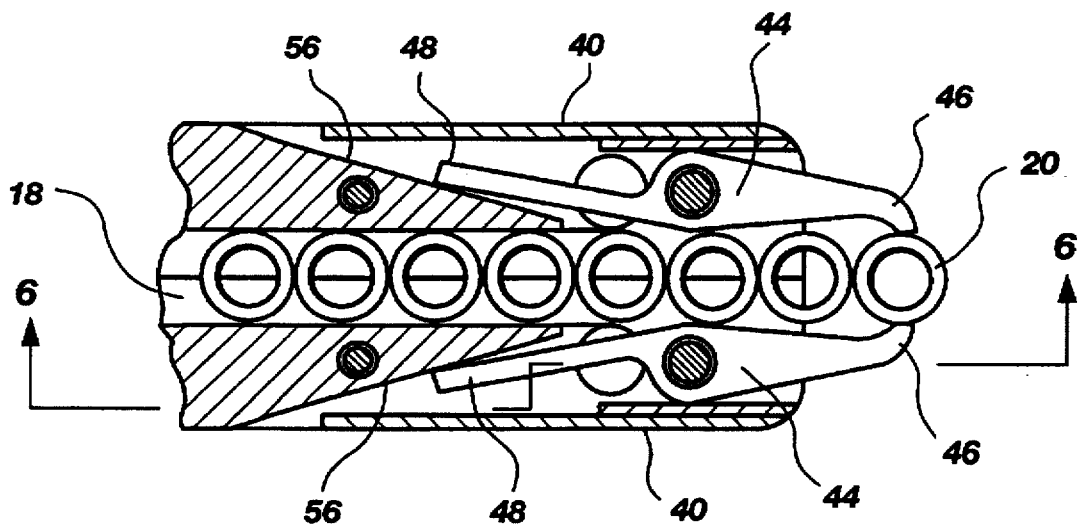
FIG. 3 is a top cross-sectional view of the dispensing end of the hand-held collar dispenser of FIG. 1 showing a pair of retention clips in an extended position.

The dispensing end 16 contains a number of cooperating mechanisms acting simultaneously which retain the supply of collars 20 within the body 12 and allow single collars 20 to be selectively dispensed from the collar dispenser 10. As illustrated in FIGS. 1, 2 and 3, the dispensing end 16 includes a pair of retention clips 44 which are configured to engage a collar 20. With specific reference to FIGS. 2 and 3, each retention clip 44 has a claw end 46 and a tail end 48. The claw end 46 of each retention clip 44 is configured to conform to the outer diameter 38 of the barrel portion of the collar 20.

It should be appreciated that the collar dispenser of the present invention may be used to apply collars having a variety of shapes. Indeed, virtually any collar having an exterior configuration which includes a generally barreled portion (i.e., constant cross-section along a portion of the longitudinal axis of the collar) may be fed through the magazine 26 and grasped by the retention clips 44. For example, bevelled collars, or collars with flanges are frequently utilized in a variety of applications. One of skill in the art will appreciate that the internal configuration of the magazine 26 may be easily modified to accommodate a variety of collar geometries, all of which are within the scope of the present invention.

It will be appreciated that a variety of retention clip 44 configurations could be utilized to retain the collars 20 within the body 12. Each retention clip 44 is pivotally mounted at the dispensing end 16 of the body 12 for movement between an open position and a closed position. In the closed position, illustrated in FIG. 2, a collar 20 is prevented from passing between the claw ends 46 of the retention clips 44. In the open position, shown in FIG. 3, a collar 20 is permitted to pass between the claw ends of the retention clips and exit the dispenser.

Figure 4:
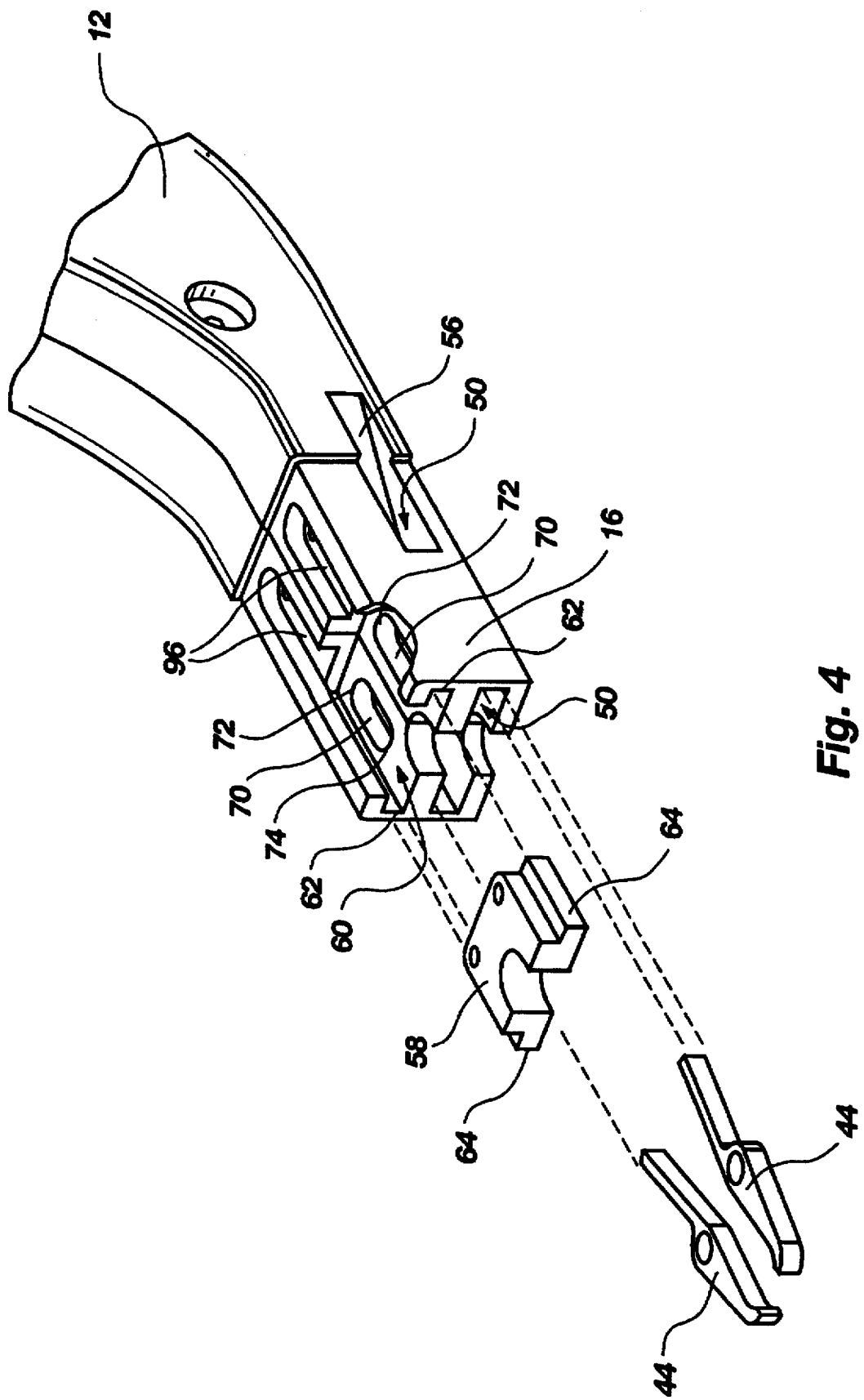
FIG. 4 illustrates a perspective exploded view of the improved hand-held collar dispenser of FIG. 1 without the outer casing.

With reference to FIGS. 2, 3, and 4, the retention clips 44 are positioned within a chamber 50 disposed within the dispensing end 16 of the body 12. The chamber 50 is partially defined by a pair of angled surfaces 56. The tail end 48 of each retention clip 44 slidably engages a respective angled surface 56. As best illustrated in FIGS. 2 and 3, the retention clips 44 are mounted within the chamber 50 such that they may move between the closed position illustrated in FIG. 2 and the open position illustrated in FIG. 3.

Referring now to FIGS. 5, 6, 7, and 8, the retention clips 44 are pivotally mounted to a guide block 58. The guide block 58 is slidably positioned within the dispensing end 16 of the body 12 (FIG. 4) and is mounted for movement between a retracted position, illustrated in FIGS. 5 and 7, and an extended position, illustrated in FIGS. 6 and 8.

As illustrated in FIG. 2, when the guide block 58 is in the retracted position, the tail end 48 of each retention clip 44 abuts a respective angled surface 56 prohibiting the retention clip 44 from rotating to an open position. As the guide block 58 and retention clips 44 move to the extended position illustrated in FIGS. 3 and 8, the tail end 48 slides along a respective angled surface 56 allowing the retention clips 44 to pivot open under the force exerted by the collar 20 on the claw ends 46 of the retention clips 44.

As best viewed in FIG. 4, a longitudinal slot 60 is disposed within the body 12 adjacent the dispensing end 16. The longitudinal slot 60 is configured to correspond to the exterior configuration of the guide block 58. The slot 60 has a pair of grooves 62 in which tabs 64 configured along opposing side edges of the guide block 58 fit. This configuration provides a stable track in which the guide block 58 can move between extended and retracted positions.

FIG. 4 also illustrates a pair of internal slots 70 configured within the body 12. Each internal slot 70 includes a first end 72 and a second end 74. The slot provides a via through the body 12 connecting the longitudinal slot 60, in which the guide block 58 is positioned, and the chamber 50, in which the retention clips 44 are positioned. It will be appreciated that the longitudinal slot 60 and guide block 58 are capable of a variety of configurations which would allow the guide block 58 to move between a retracted and an extended position.

Figure 5:
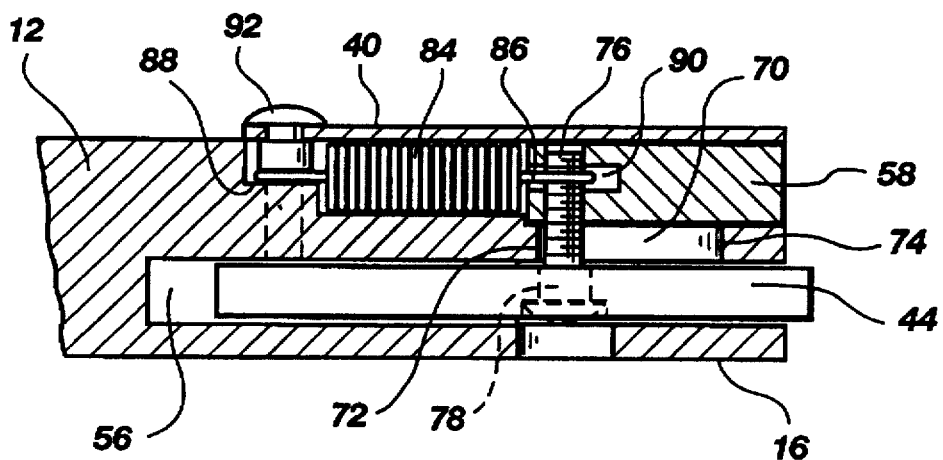
FIG. 5 is a partial side cross-sectional view of the improved hand-held collar dispenser of FIG. 2 taken along line 5—5 of FIG. 2, showing an internal slot with the pivot pin connecting the retention clips to the guide block positioned therein and the guide block in the retracted position.
Figure 6:
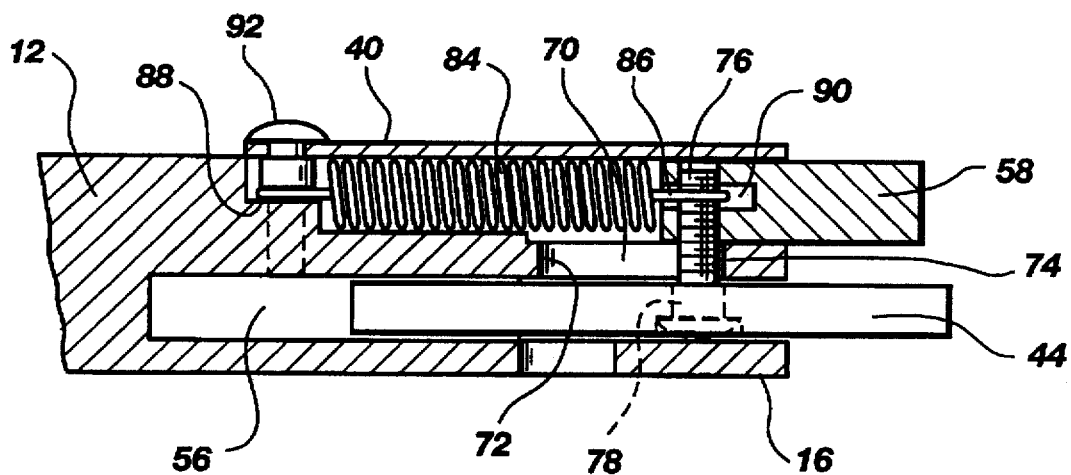
FIG. 6 is a partial side cross-sectional view of the improved hand-held collar dispenser of FIG. 3 taken along line 6—6 of FIG. 3, showing an internal slot with the pivot pin connecting the retention clips to the guide block positioned therein and the guide block in the extended position.
Figure 7:
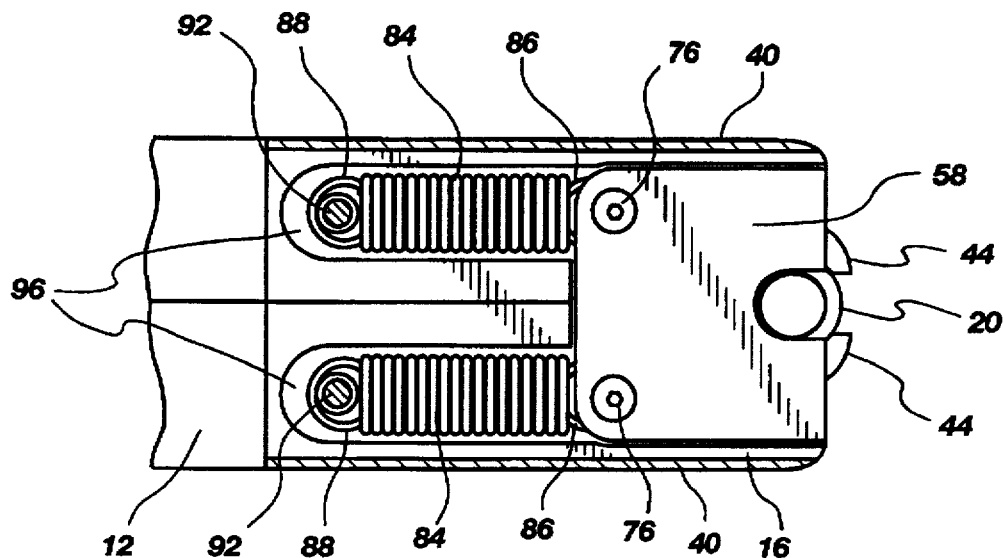
FIG. 7 is a top cross-sectional view of the improved hand-held collar dispenser of FIG. 1 showing the guide block and biasing spring in a retracted position.

With reference now to FIGS. 5 and 6, a pair of pivot pins 76 extend through a respective retention clip 44 and into the guide block 58, thereby providing an axis of rotation for each retention clip 44. In this preferred embodiment, a bushing 78 is press fit into the opening of each retention clip 44 through which each pivot point passes to allow for increased ease of rotation by the retention clips 44 about the pivot pin 76.

Each pivot pin 76 is positioned within a respective internal slot 70. The first and second ends 72, 74 of each slot 70 define the limits of travel of the pivot pins 76, and consequently, the guide block 58 and retention clips attached to the pivot pins 76. The first end 72 of the of the internal slot 70 is positioned within the body 12 to allow the retention clips 44 to retract far enough to pivot to a closed position while limiting the retraction of the retention clips 44 to allow for partial extension of the collar 20 beyond the body 12. The second end 74 of the internal slot 70 is positioned within the body 12 to allow the retention clips to extend and pivot to the point of escape for a collar. The second end 74 is also positioned to prevent the springs 84 from extending beyond their elastic limit. It will be appreciated that the number and dimension of the internal slots 70 can vary so long as means are provided for limiting the travel of the pivot pin 76, and correspondingly, the retention clips 44.

Referring again to FIGS. 5, 6, 7, and 8, the guide block 58 is biased towards the retracted position by means of a spring 84 corresponding to each retention clip 44. Each spring 84 has a first end 86 attached to the guide block 58 and a second end 88 attached to the body 12. As can best be seen in the preferred embodiments of FIGS. 7 and 8, each spring 84 is positioned within a slot 96 disposed within body 12.

With particular reference to FIGS. 5 and 6, the first end 86 of each spring 84 contains a loop positioned within a small axial notch 90 in the guide block 58. A respective pivot pin 76 penetrates the interior walls of the notch 90 and the loop positioned therebetween capturing the first end 86 of the spring 84 and securing it to the guide block 58. The second end 88 of each spring 84 is attached to the body 12 in similar fashion. A pair of screws 92 penetrate the casing 40 and the looped second end 88 of the spring 84. A spacer 94 is positioned between the head of the screw and the second end 88 of the spring 84 to align the ends 86, 88 of the spring 84 within its respective slot 96. It will be appreciated that there are many ways to anchor a movable part with a biasing spring. Furthermore, the teachings of this invention could be practiced with alternative biasing means which are conventionally known in the art.

Referring now to FIGS. 10 and 11, the dispensing end 16 of the body 12 includes an exterior configured with a generally U-shaped notch. The notch is comprised of aligned notch segments 100, 102, and 104 disposed within the body 12, the guide block 58, and the casing 40, respectively. The notch segments 100, 102, and 104 have substantially the same dimension. The diameter of the curve portion of the notch is preferably substantially equal to the inner diameter 36 of the collar 20. With the retention clips 44 in the closed position, and a collar 20 engaging the retention clips 44, the notch segments 100, 102, and 104 are aligned with the interior of the collar 20. In this position, a lockbolt 110 is positionable within the notch segments 100, 102, and 104 and within the collar 20.

Figure 9:
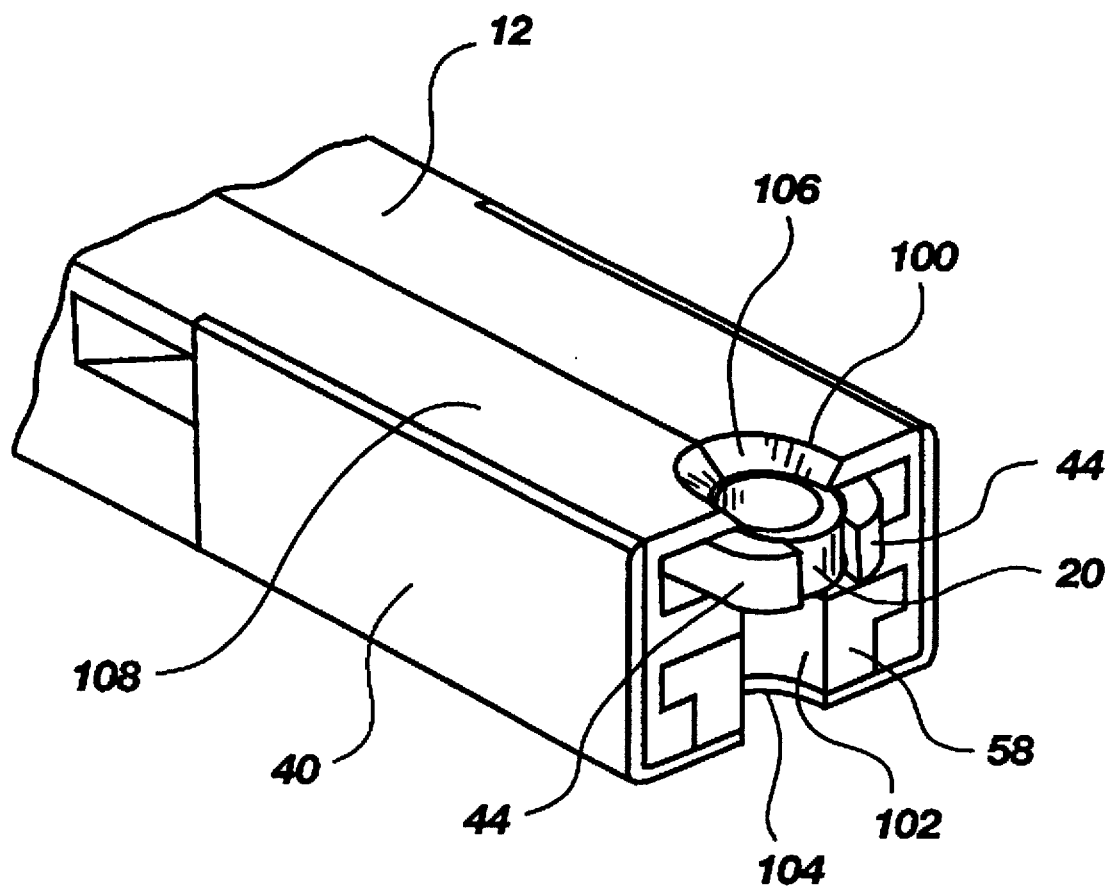
FIG. 9 is a bottom perspective view of the improved hand-held collar dispenser of FIG. 1 showing a beveled U-shaped notch.

Referring now to FIG. 9, the bottom surface 108 of the body 12, which is the leading surface to be positioned over a lockbolt, is illustrated. The U-shaped notch is configured with a beveled leading edge 106 to facilitate placement of the device 10 over the lockbolt. In this preferred embodiment, a rubber flap (not shown) is secured with screws or other conventional means to the bottom surface of the body 12. The flap helps prevent the collar dispenser 10 from nicking or scratching the surface through which the lockbolt is projecting when the collar dispenser 10 is used to place a collar 20 over the lockbolt.

In operation, the hand-held collar dispenser is used by feeding a supply of collars 20 into the feeding end 14 of the body 12 and urging them through the interior channel 18 towards the dispensing end 16 by means of air pressure directed into the feeding end 14 of body 12 through the collar magazine 26, as illustrated in FIG. 1. The collar magazine is connected to a pressurized source of air, such as shop air. The collar magazine 26 is preferably pre-filled with a supply of collars 20 and attached to the feeding end 14 of the body 12 by means of a push-pin clasp 30. As air blows through the magazine 26, the collars 20 in the magazine 26 are directed single file into the feeding end 14 and through the channel 18 toward the dispensing end 16. The air pressure applied into the feeding end 14 of the body 12 will be at least 5 pounds per square inch. In this preferred embodiment, the air pressure applied into the feeding end 14 of the body 12 is between 20 pounds per square inch and 60 pounds per square inch.

It will be appreciated that the teachings of this invention can be practiced using a number of methods of introducing the collars 20 into the channel 18 and urging them through the channel 18. For example, the collars 20 could be contained in a clip or magazine which feeds the collars one at a time into the air flow.

At the dispensing end 16, the first collar 20 in the line engages the retention clips 44 which are biased in the closed position preventing collar 20 from exiting the dispenser. The biasing means consists of a combination of factors. The substantially rigid retention clips 44 are prohibited from pivoting to an open position when the guide block 58 is in the retracted position because the tail end 48 of each clip 44 abuts a respective angled surface 56 within the retention clip chamber 50. The guide block 58 is maintained in a retracted position by means of the springs 84 until the user desires to dispense a collar 20 from the dispenser.

A collar is dispensed by the user positioning the collar dispenser 10 over the lockbolt 110 or other fastening device with which the collar is to be used as illustrated in FIG. 10. The user then draws the collar dispenser 10 away from the lockbolt in a plane substantially parallel to the surface through which the lockbolt 110 is projecting, as shown in FIG. 11. The action of drawing away the dispenser 10 from the stationary lockbolt 110 creates a force exerted by the lockbolt on the inner surface of the collar 20 in a direction opposite the direction in which the collar is drawn away. The force on the collar 20 is transferred to the claw ends 46 of the retention clips 44. Because the retention clips 44 cannot pivot while in a retracted position, the force on the retention clips draws them out of the chamber 50 within the body 12.

As illustrated in FIGS. 2 and 3, as the retention clips 44 are drawn against the biasing force of the springs 84 toward an extended position, the tail ends 48 of each retention clip 44 slide along their corresponding angled surfaces 56. In so doing, the retention clips 44 gradually rotate to an open position allowing a collar 20 to pass between the claw ends 46 of the retention clips 44 and exit the dispenser 10.

Figure 8:
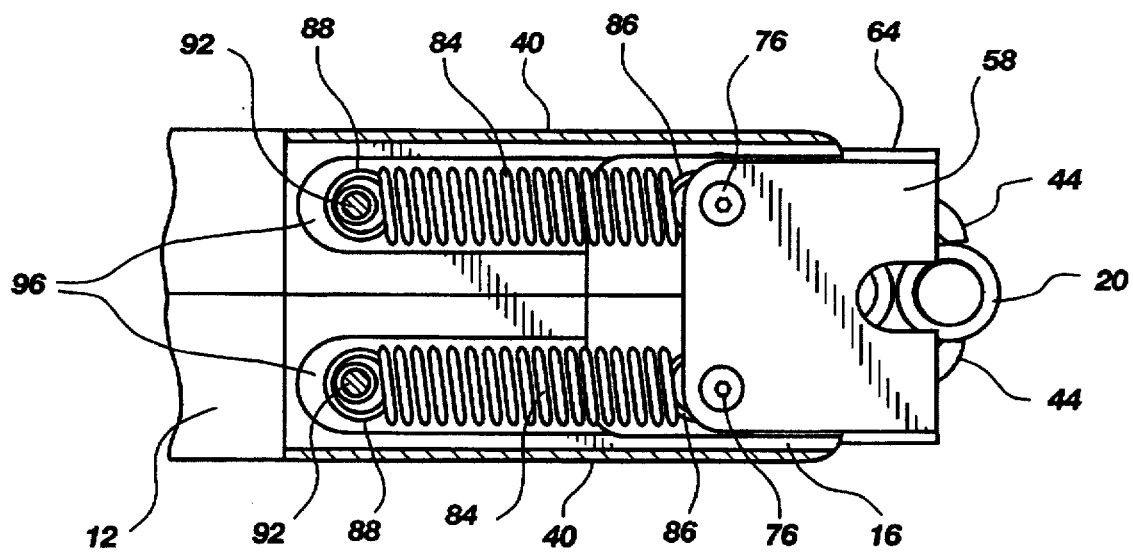
FIG. 8 is a top plan view of the improved hand-held collar dispenser of FIG. 1 showing the guide block and biasing spring in an extended position.

As shown in FIGS. 3 and 8, as the retention clips 44 are drawn out from the body 12, the guide block 58, to which the retention clips 44 are connected, is also drawn out. As the collar 20 passes between the claw ends 46 of the retention clips 44, there is no longer a force exerted upon the free collar 20. Thus, the force of the biasing spring 84 is unopposed and the springs 84 urge the guide block 58 back to a retracted position. As the guide block 58 is retracted by the springs, the retention clips 44 which are connected to the guide block 58 are also forced to retract. As the retention clips 44 are retracted, the tail end 48 of each retention clip 44 slides along the angled surface 58 thereby forcing the retention clips 44 to pivot to a closed position and capture the next collar 20.

It should be appreciated that the apparatus and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A hand-held collar dispenser comprising:
   a body having a feeding end and a dispensing end and including a channel disposed between the feeding end and the dispensing end, the channel configured such that a collar fed into the feeding end may pass through the channel to the dispensing end, the channel configured to thereby permit a supply of collars to pass through the channel in end-to-end alignment;

at least one retention clip, the clip having a claw end and being pivotally mounted at the dispensing end of the body for movement between an open position in which a collar is permitted to pass by the claw end of the retention clip and exit the dispenser and a closed position in which collars are prevented from passing by the claw end of the retention clip, the retention clip being biased towards the closed position; and means for urging a supply of collars through the interior channel towards the dispensing end, the urging means configured to apply a substantially constant force to the supply of collars, and a guide block slidably positioned within the dispensing end of the body, the retention clip being pivotally mounted to the guide block.

2. A hand-held collar dispenser as described in claim 1, wherein two retention clips, each clip having a claw end, are pivotally mounted at the dispensing end of the body for movement between an open position in which a collar is permitted to pass between the claw ends of the retention clips and exit the dispenser and a closed position in which collars are prevented from passing between the claw ends of the retention clips, the retention clips being biased towards the closed position.

3. A hand-held collar dispenser as described in claim 1, wherein the guide block is mounted for movement between a retracted position in which the retention clip is in the closed position, and an extended position in which the retention clip is in the open position.

4. A hand-held collar dispenser as described in claim 3, further comprising at least one angled surface disposed within the dispensing end of the body, the retention clip positioned in slidable engagement with a respective angled surface such that as the guide block moves between the retracted and extended positions, the retention clip slides along the angled surface thereby permitting the retention clip to rotate between the closed and open positions.

5. A hand-held collar dispenser as described in claim 3, further comprising a pair of angled surface disposed within the dispensing end of the body.

6. A hand-held collar dispenser as described in claim 4, wherein the retention clips are further configured with a tail end, the tail end of each retention clip positioned in slidable engagement with the respective angled surface of the tail end of the retention clip.

7. A hand-held collar dispenser as described in claim 1, further comprising at least one pivot pin corresponding to at least one retention clip, the pivot pin extending through its respective retention clip and into the guide block and providing an axis of rotation for its respective retention clip.

8. A hand-held collar dispenser as described in claim 3, further comprising at least one spring having one end attached to the guide block and a second end attached to the body, the spring positioned to bias the guide block towards the retracted position.

9. A hand-held collar dispenser as described in claim 1, wherein the channel is configured to maintain a plurality of collars in substantially end-to-end alignment as the collars pass through the channel.

10. A hand-held collar dispenser as described in claim 1, wherein the means for urging a supply of collars through the interior channel towards the dispensing end comprises a supply of air directed into the feeding end of body.

11. A hand-held collar dispenser comprising:

a body having a feeding end and a dispensing end and including a channel disposed between the feeding end and the dispensing end, the channel configured such that a collar fed into the feeding end may pass through the channel to the dispensing end;

a pair of retention clips, each clip having a claw end and a tail end, the retention clips being pivotally mounted at the dispensing end of the body for movement between an open position in which a collar is permitted to pass between the claw ends of the retention clips and exit the dispenser and a closed position in which collars are prevented from passing between the claw ends of the retention clips, the retention clips being biased towards the closed position;

a guide block slidably positioned within the dispensing end of the body for movement between a retracted position in which the retention clips are in the closed position and an extended position in which the retention clips are in the open position, the guide block being biased towards the retracted position;

a pivot pin corresponding to each retention clip, each pivot pin extending through its respective retention clip and into the guide block and providing an axis of rotation for its respective retention clip;

a pair of angled surfaces disposed within the dispensing end of the body, the tail end of each retention clip positioned in slidable engagement with a respective angled surface such that, as the guide block moves between the retracted and extended positions, each retention clip slides along its corresponding angled surface, thereby permitting the retention clips to rotate between the closed and open positions;

at least one spring having one end attached to the guide block and a second end attached to the body, the spring positioned to bias the guide block towards the retracted position; and means for urging a supply of collars through the interior channel towards the dispensing end.

12. A hand-held collar dispenser as described in claim 11, wherein the channel is configured to maintain a plurality of collars in substantially end-to-end alignment as the collars pass through the channel.

13. A hand-held collar dispenser as described in claim 11, wherein the means for urging a supply of collars through the interior channel towards the dispensing end comprises a supply of air directed into the feeding end of the body.

14. A hand-held collar dispenser as described in claim 11, wherein the dispensing end of the body is further configured with a longitudinal slot configured to correspond to the exterior configuration of the guide block.

15. A hand-held collar dispenser as described in claim 11, further comprising a spring corresponding to each retention clip, each spring attached at one end to the pivot pin of its respective retention clip and attached at the other end to the body, thereby biasing the guide block towards the retracted position.

16. A hand-held collar dispenser as described in claim 11, wherein the body is configured with an internal slot corresponding to each pivot pin, each pivot pin positioned within its respective internal slot.

17. A hand-held collar dispenser as described in claim 16, wherein each internal slot includes a first end and a second end which define the limits of travel of the pivot pins, each pivot pin abutting the first end of its respective internal slot when the guide block is in the retracted position and abutting the second end of its respective internal slot when the guide block is in the extended position.

18. A hand-held collar dispenser as described in claim 11, wherein each collar has an inner diameter and an outer diameter, the claw end of each retention clip being configured to conform to the outer diameter of the collar.

19. A hand-held collar dispenser as described in claim 11, wherein the dispensing end of the body includes an exterior configured with a generally U-shaped notch, the notch positioned for alignment with a collar which has been positioned in engagement with the retaining clips in the closed position.

20. A hand-held collar dispenser as described in claim 19, wherein the U-shaped notch is configured with a leading edge which is beveled.

21. A hand-held collar dispenser as described in claim 11, wherein the air pressure applied into the feeding end of the body is between 20 pounds per square inch and 60 pounds per square inch.

22. A hand-held collar dispenser comprising:

a body having a feeding end and a dispensing end and including a channel disposed between the feeding end and the dispensing end, the channel configured such that a collar fed into the feeding end may pass through the channel to the dispensing end, the channel configured to thereby permit a supply of collars to pass through the channel in end-to-end alignment;

at lease one retention clip, the clip having a claw end and being pivotally mounted at the dispensing end of the body for movement between an open position in which a collar is permitted to pass by the claw end of the retention clip and exit the dispenser and a closed position in which collars are prevented from passing by the claw end of the retention clip, the retention clip being biased towards the closed position, the retention clip and the body configured to define a pin opening at least the same size as the interior diameter of the collar, said pin opening extending the entire distance of the dispensing end of the body; and means for urging a supply of collars through the interior channel towards the dispensing end, the urging means configured to apply a substantially constant force to the supply of collars.

* * * * *